P. McCOOK.
ANTISKID DEVICE FOR AUTOMOBILES.
APPLICATION FILED DEC. 3, 1920.

1,406,403. Patented Feb. 14, 1922.

INVENTOR
P. McCook
BY
ATTYS

UNITED STATES PATENT OFFICE.

PETER McCOOK, OF WINNIPEG, MANITOBA, CANADA.

ANTISKID DEVICE FOR AUTOMOBILES.

1,406,403.  Specification of Letters Patent.  Patented Feb. 14, 1922.

Application filed December 3, 1920. Serial No. 428,021.

*To all whom it may concern:*

Be it known that I, PETER McCOOK, of the city of Winnipeg, in the Province of Manitoba, Canada, have invented certain new and useful Improvements in Antiskid Devices for Automobiles, of which the following is the specification.

The invention relates to improvements in anti-skid devices, particularly adapted for automobiles, trucks and such like and an object of the invention is to provide an appliance which can be quickly attached to the wheel and around the tire and will effectively prevent skidding or side slipping and which is also arranged so that it can be utilized to positively prevent sinking in soft roads even where the vehicle is heavily loaded.

A further object of the invention is to construct the appliance so that for normal road conditions skidding or side slipping is prevented and such that should the wheel become sunk in a rut a lifting bar forming part of the equipment can be applied which will lift the wheel out of the rut under the power of the engine.

A further object of the invention is to construct the appliance in a cheap and durable manner and so that it can be fitted on the tire in sections and such that the various sections can be quickly and tightly fastened to the wheel.

With the above more important objects in view the invention consists essentially in the arrangement and construction of parts hereinafter more particularly described and later pointed out in the appended claims, reference being had to the accompanying drawing in which:—

In the drawing like characters of reference indicate corresponding parts in the several figures.

Figure 1:
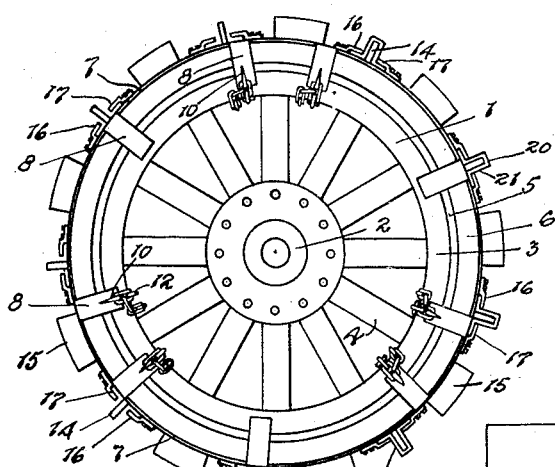
Fig. 1 is a side view of the device applied on a wheel.
Figure 3:
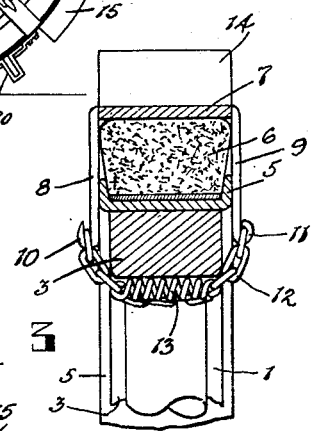
Fig. 3 is a sectional view through the rim of the wheel showing the appliance thereon.

1 represents a truck wheel comprising the customary hub 2, felloe 3, spokes 4, rim 5 and tire 6, the tire in the present instance being shown as a hard rubber tire. The anti-skidding device which I provide comprises a number of similar sections adapted to be applied on the wheel around the tire so that it actually forms the tread face of the wheel.

In the present instance I have shown the appliance as formed from three sections which when applied completely enclose the tire, the ends of the sections butting. Each section comprises a metallic shoe or base plate 7 of predetermined length and of a width approximately equal to the width of the tire and curved concentric to the hub so as to lie on or fit the tread face of the tire. The base plate or shoe is provided at the sides with pairs of lugs 8 and 9, there being a set of lugs towards each end of the plate and a set at the middle. The lugs extend inwardly beyond the rim and terminate approximately midway of the felloe. The end pairs of lugs are formed to present hooks 10 at one side and eyes 11 at the other. The central lugs are plain, being utilized to prevent side movement of the shoe on the tire.

To the eyes 11 I connect chains 12, which chains are adapted to pass across the felloe and catch on the hooks. With each chain I associate a comparatively strong coiled spring 13 which has its ends connected to selected links of the chain and the springs are designed to take a position on the inner side of the felloe when the chains are tightened up and caught on the hooks.

According to this arrangement the shoes will always be held tightly in place on the wheel. This feature will be later explained.

Each shoe is fitted on the tread face with a plurality of suitably spaced radially disposed transversely extending wings or lugs 14 and in a location intermediately between the transverse lugs with circumferentially or lengthwise extending centrally positioned wings or lugs 15, the lugs 14 being adapted to prevent skidding of the wheel and those 15 side slipping thereof.

Under normal road conditions the applied shoes will be sufficient to prevent side slipping or skidding but where heavy roads are encountered it is necessary to have as part of the equipment means for preventing the wheel from sinking in the mud or for getting the wheel out of a mud hole or rut under the power of the engine provided it has sunk. To this end I attach to the shoes at suitable intervals pairs of opposing clips 16 and 17, 18 and 19, the pairs of clips being preferably placed at an equal distance from and at opposite sides of the transverse lugs or wings 14. These pairs of clips form guides for T-shaped lifting bars 20 of predetermined link and which are slotted in the web 21 to provide lengthwise extending channels 22 adapted to receive the lugs 14 when the lifting bars are placed on the wheels.

Figure 2:
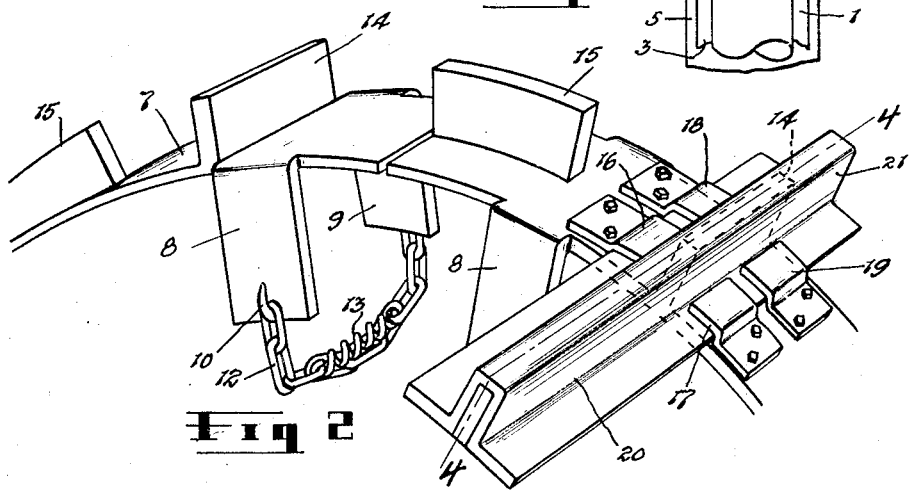
Fig. 2 is a perspective view of part of two sections.
Figure 4:
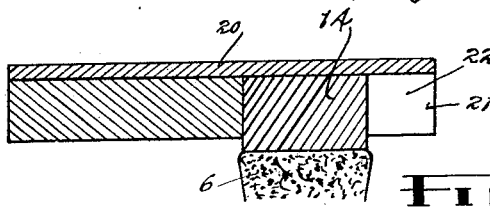
Fig. 4 is a longitudinal sectional view centrally through one of the lifting bars.

Reference is particularly made at this time to Figures 2 and 4 of the drawing where it will be seen that it is an easy matter to attach the lifting bar to the shoe as one has simply to slide the lifting bar end on under the clips and with the wing entered in the channel. When the lifting bar has reached its final position it is stopped by the wing engaging the inner end of the channel.

Obviously the construction forms not only a quick means for attaching the lifting bar but also forms a very strong connection and at the same time accurately places the lifting bar in respect to the shoe.

It is pointed out that one end of the lifting bar projects beyond the shoe further than the other. The reason for this is that there is only a limited distance for the lifting bar between the body of the truck and the wheel and the short projecting end of the lifting bar is the end that projects towards the truck body. In actual practice this will be kept as long as consistent with safety and the distance having been determined and the channels made accordingly, one is assured that when the lifting bars have been finally slid into place they are all properly and safely placed in respect to the truck body.

In order to make this point clear I might further explain that obviously if the inner ends of the bars went too far in they would strike the truck body or parts associated therewith and thereby damage the truck.

When one is on comparatively good roads the lifting bars are not used. However, if the roads are bad one would put on the lifting bars before starting out with the result that with a heavy load the rear wheels could not sink or skid. On the other hand if one became mired or stuck with the wheel without the lifting bars he could apply one or more of the lifting bars which he could carry as part of his equipment placing the lifting bars on the front part of the wheel with the first one as near to the rut as possible. Then upon slowly turning the wheel under the engine power the wheel would lift itself out of the rut as the lifting bar would span the rut and would present sufficient surface to prevent the lifting bar from sinking.

In connection with the springs, I wish to explain that when the shoes are put on, the chains are pulled as tight as possible, the springs being thereby brought under tension. Owing to the truck load there will always however be a compression of the tire at the roadside, which tends to loosen the chains as they pass. This looseness at the time is taken up by the springs and of course naturally disappears when the tire expands again and tightens the chains.

Whilst I have entered into a detailed description of the various parts I wish it to be understood that they could be readily modified without departing from the spirit of the invention as set forth in the accompanying claims.

What I claim as my invention is:—

1. The combination with the tire of a wheel, of a shoe applied on the tread side of the tire and attached to the wheel, transversely disposed radially directed ribs extending from the shoe, T-shaped lifting bars crossing the shoe at the ribs and provided with channels receiving the ribs and pairs of clips fastening the edges of the T-shaped bars to the shoe, the said clips being placed at opposite sides of the ribs.

2. A traction shoe for wheels comprising a tire engaging plate, a mud lug releasably held to said plate, and a stiffening rib on the plate fitting into a recess provided therefor in the said lug, said recess being open at one end to provide for longitudinal movement of the rib therein when removing or applying the lug.

3. A traction shoe for wheels comprising a plate, a rib extending outwardly therefrom, a mud lug having a channel slidably receiving said rib therein and guides on opposite sides of said rib engaging the lug and serving to retain the latter against the outer face of the plate.

Signed at Winnipeg, this 4th day of November, 1920.

PETER McCOOK.

In the presence of—
GERALD S. ROXBURGH,
K. B. WAKEFIELD.